March 6, 1951 — F. W. PORTER — 2,544,543

MULTISPEED TRANSMISSION

Filed Oct. 1, 1949 — 3 Sheets-Sheet 1

INVENTOR.
FRANCIS W. PORTER.
BY Victor D. Behn
ATTORNEY

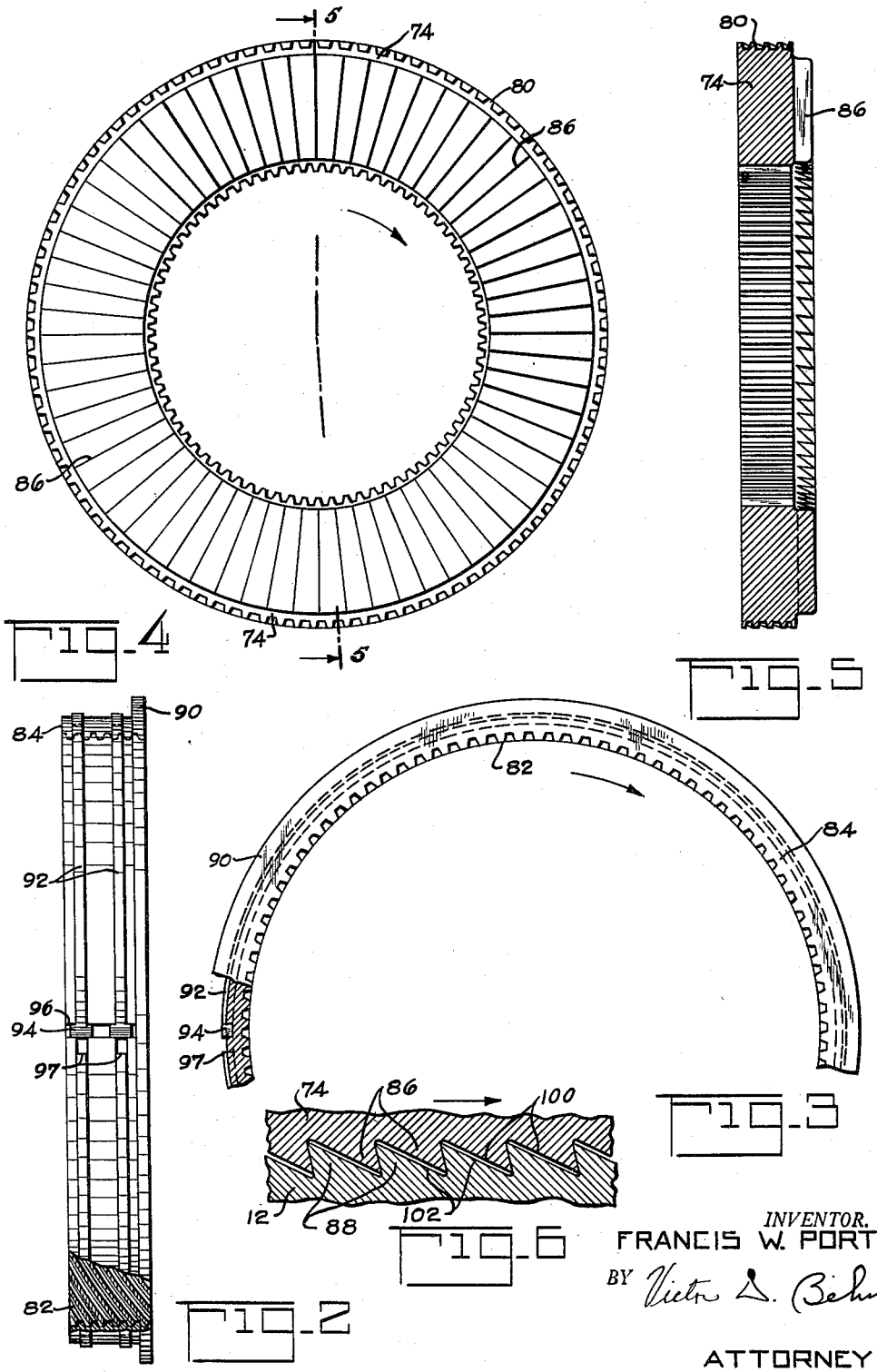

March 6, 1951    F. W. PORTER    2,544,543
MULTISPEED TRANSMISSION

Filed Oct. 1, 1949    3 Sheets-Sheet 3

INVENTOR.
FRANCIS W. PORTER.
BY
ATTORNEY

Patented Mar. 6, 1951

2,544,543

UNITED STATES PATENT OFFICE 2,544,543

MULTISPEED TRANSMISSION

Francis W. Porter, Marshfield, Mass., assignor to Wright Aeronautical Corporation, a corporation of New York Application October 1, 1949, Serial No. 119,044

8 Claims. (Cl. 74—751)

This invention relates to multi-speed transmissions and is particularly directed to the type of transmission illustrated in copending application Serial No. 609,432, filed August 7, 1945, in the name of Davis et al.

The transmission described in said copending application has been used on aircraft engines as a two-speed transmission for their engine driven superchargers. Said transmissions have performed satisfactorily except for the short life, in certain installations, of the one-way roller clutch employed therein. An object of the present invention comprises the provision of a two-speed transmission having the advantages of the two-speed transmission described in said copending application but in which the one-way roller clutch of said prior transmission has been eliminated. In accordance with the present invention the one-way roller clutch of said prior transmission has been replaced in a novel manner by a one-way jaw clutch.

Other objects of the invention will become apparent upon reading the annexed detailed description in connection with the drawing in which:

Figure 2 is a side view partly in section of a synchronizer ring forming part of a one-way jaw clutch incorporated in Figure 1;

Figure 3 is an end view partly in section of said synchronizer ring as viewed from the right of Figures 1 and 2;

Figure 4 is an end view of the one-way jaw clutch member as viewed from the right in Figure 1;

Figure 5 is a sectional view taken along line 5—5 of Figure 4;

Figure 6 is a sectional view taken along line 6—6 of Figure 1; and

The invention has been designed for use as a two-speed drive for the supercharger of an aircraft internal combustion engine. As will appear, however, the invention is not limited to this specific use and instead is of general application.

Figure 1:
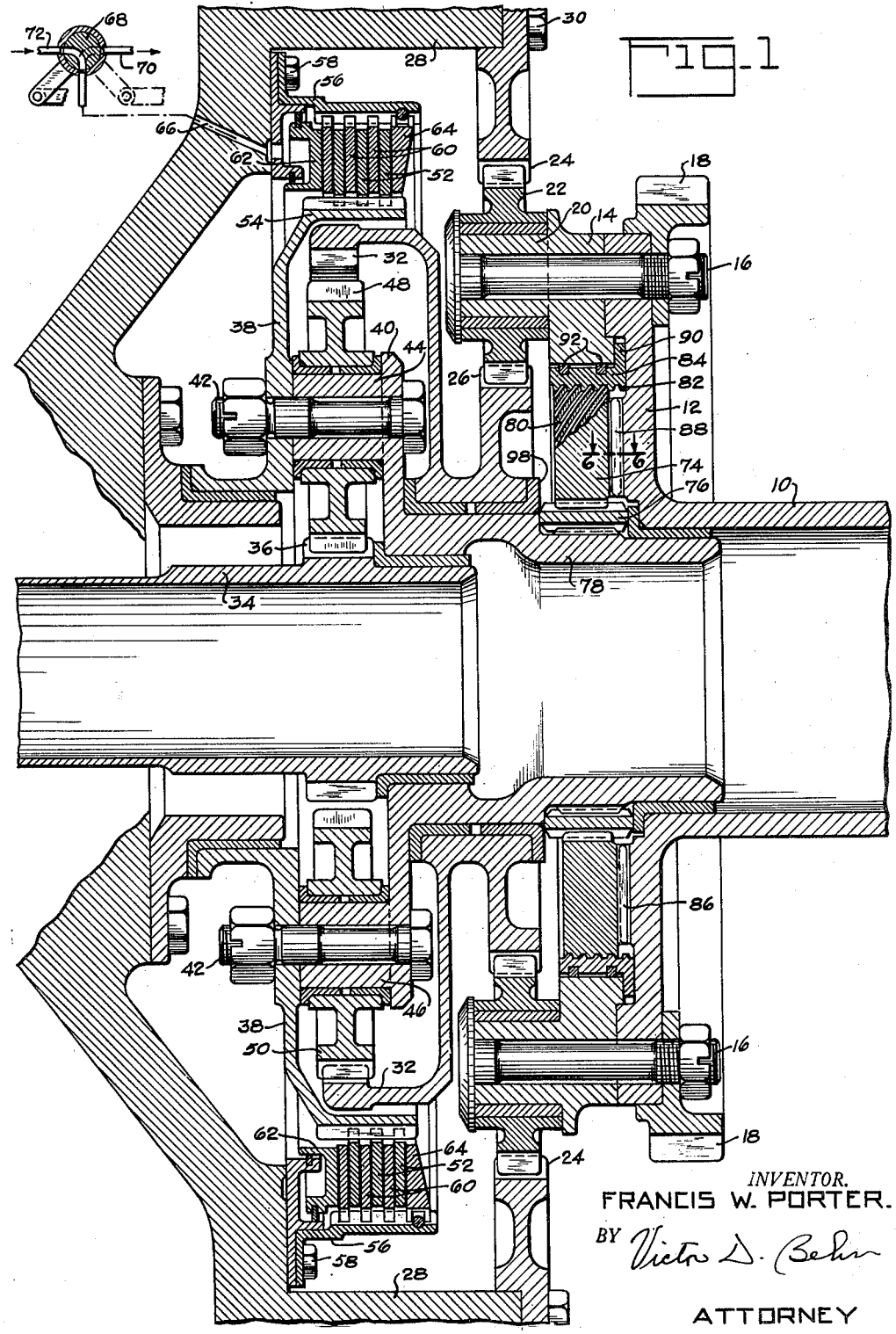
Figure 1 is an axial sectional view of a transmission embodying the invention.
Figure 7:
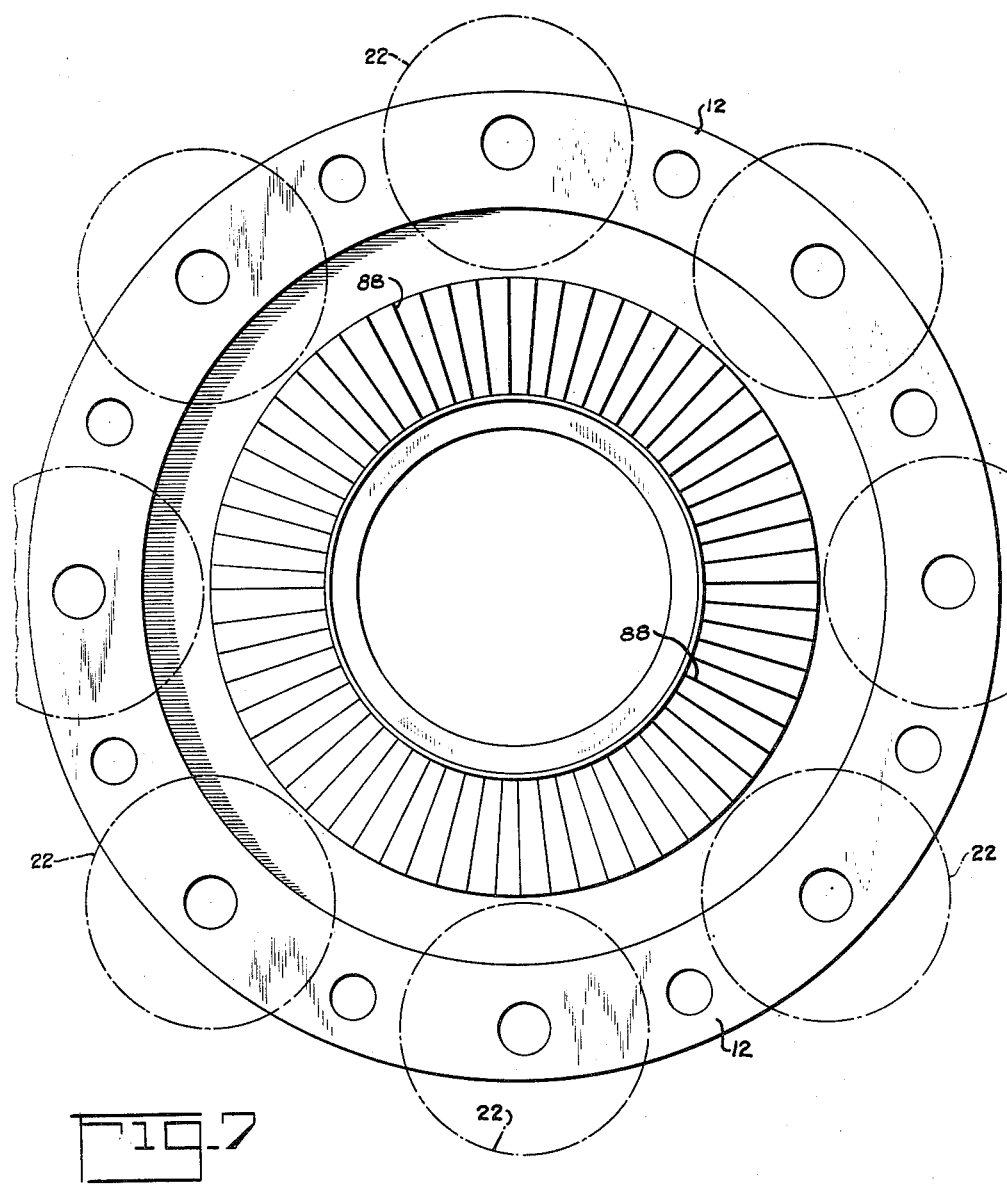
Figure 7 is an end view of the transmission input shaft as viewed from the left in Figure 1 and illustrating the planet pinions carried by said shaft.

Referring to the drawing, an engine (not shown) is drivably connected to a shaft 10 for driving said shaft clockwise when viewed from the right in Figure 1. The shaft 10 has a radially extending annular flange 12 and an annular member 14 is rigidly secured to said shaft flange 12 by bolts 16. A gear 18 is also secured to the shaft flange 12 by the bolts 16, said gear being provided for driving various accessories of the engine.

The annular input shaft member 14 has a plurality of circumferentially spaced studs 20 extending therefrom and planet pinions 22 are journaled on the studs 20, said pinions being secured thereon by the bolts 16. Each pinion 22 is disposed in meshing engagement with an internal gear 24 and with a sun gear 26, said sun gears being concentric. The internal gear 24 is secured against rotation to a fixed housing 28 by screws 30 whereby a step-up drive is provided from the engine driven shaft 10 to the sun gear 26. Preferably the internal gear 24 is secured to the fixed housing 28 through a flexible connection as described in said copending application.

The sun gear 26 is formed integral with an internal gear 32 which forms the input member of a planetary gear train. A shaft 34 has a sun gear 36 which forms the output member of said planetary gear train. A composite planet pinion carrier comprising members 38 and 40 is secured together by bolts 42. The carrier member 40 has a plurality of circumferentially spaced pairs of studs 44 and 46 about which a plurality of pairs of planet pinions 48 and 50, respectively, are journaled. The planet pinions 48 and 50 of each pair are disposed in meshing engagement with each other and each pinion 48 is also disposed in meshing engagement with the sun gear 36 while each pinion 50 is also disposed in meshing engagement with the internal gear 32. This structure of the planetary gear train is more fully described in connection with Figure 5 of said copending application.

A plurality of annular friction brake plates 52 are splined to and are disposed about an annular rim 54 integral with the planet carrier member 38. An annular drum 56 is secured to the fixed housing 28 by screws 58. A plurality of annular friction brake plates 60 are splined to and are disposed internally of the annular drum 56. The friction brake plates 52 and 60 are alternately disposed so that when said plates are clamped together the composite pinion carrier member is held against rotation to the fixed housing 28 whereupon a step-up speed ratio drive is provided from the input member 32 to the output shaft 34, said composite pinion carrier providing the reaction torque for said step-up drive.

In order to engage the friction brake plates 52 and 60, a piston 62 is slidable to clamp the brake plates between said piston 62 and a backing plate 64. A suitable fluid, such as engine lubricating oil, is adapted to be supplied under pressure against the piston 62 through a passage 66 under the control of a valve 68. In the full line position of the valve 68, as illustrated in Figure 1, the passage 66 is connected to a drain passage 70 whereupon the friction brake plates 52 and 60 are disengaged. When the valve is moved to its dotted-line position, the passage 66 is connected to a fluid pressure supply passage 72 whereupon said fluid pressure acts against the piston 62 to clamp the friction brake plates 52 and 60 together.

When the friction brake plates 52 and 60 are clamped together to hold the composite pinion carrier 38, 40 against rotation, a relatively high step-up speed ratio drive is provided from the input shaft 10 to the output shaft 34, said composite pinion carrier providing the reaction torque for said drive. If the friction brake plates 52 and 60 are now disengaged, the composite planet carrier member 38, 40 is rotated by and in the direction of said reaction torque. Means are provided to constrain said pinion carrier member to rotation at the speed of the input shaft 10 thereby providing a relatively low step-up speed ratio drive from the input shaft 10 to the output shaft 34. In said copending application a one-way clutch is provided for this latter purpose whereas in accordance with the present invention a positive one-way toothed or jaw clutch is provided for this purpose. Except for this difference in clutch structure the transmission herein disclosed is substantially the same as that disclosed in Figure 5 of said copending application.

The positive toothed clutch of the present invention comprises an annular clutch member 74 axially splined to an adapter ring 76 which in turn is axially splined to the hub 78 of the pinion carrier member 40 for rotation therewith. The clutch member 74 is provided with left-hand external helical splines or threads 80 meshing with corresponding internal helical splines or threads 82 on a synchronizer ring 84. The clutch member 74 is also provided with axially extending jaws 86 adapted to mesh with the corresponding jaws 88 formed on the adjacent side of the input shaft flange 12. The nature of these jaws is best seen in Figure 6.

The synchronizer ring 84 is loosely disposed within the annular input shaft member 14. In addition the synchronizer ring 84 has an annular radially extending flange 90 extending loosely into an annular groove formed between the input shaft member 14 and the input shaft flange 12 to prevent axial movement of the synchronizer ring 84 relative to the input shaft 10 while permitting rotation of said ring relative to said input shaft. A pair of split rings 92 are fitted within external annular grooves extending about the synchronizer ring 84. Each of the split rings 92 has a head 94 fitted within a cross slot 96 in the synchronizer ring to prevent rotation of the split rings relative to the synchronizer ring. The split rings 92 are made with a bias which causes them to expand against the interior surface of the annular input shaft member 14 regardless of whether said synchronizer ring 84 is rotating or stationary.

When the brake 52, 60 is released, the composite pinion carrier 38, 40 is freed and the reaction torque on said pinion carrier urges it clockwise as viewed from the right in Figure 1, so that said pinion carrier rotates at a progressively increasing speed in the same direction as the input shaft 10. The clutch member 74 and synchronizer ring 84 rotate with the composite pinion carrier 38, 40. As long as the input shaft member 14 is rotating faster than the clutch member 74 and the synchronizer ring 84, the split rings 92 are forced to contract slightly around the outside of the synchronizer ring 84. This action takes place because, as best seen in Figures 2 and 3, the split rings 92 are so installed or disposed on the synchronizer ring 84 that their free ends 97 are pointed in the direction of rotation of the input shaft 10 whereby the higher speed of the annular input member 14 tends to cause said split rings to warp up around the outside of the synchronizer ring 84. This action tends to reduce the original bias of the split rings 92, but sufficient frictional drag still remains between the split rings 92 and the input shaft member 14 so that by means of the split ring heads 94 and the cross slots 96 this frictional drag tends to rotate the synchronizer ring clockwise (as viewed from the right in Figure 1) ahead of the clutch member 74 thereby urging the clutch member 74 toward the left (as viewed in Figure 1) against a shoulder 98. When, however, the speed of the clutch member 74 tends to exceed that of the input shaft 10, the frictional drag of the split rings 92, against the interior surface of the annular input member 14, is greatly multiplied because said split rings are forced to expand against the interior surface of the annular input member 14. This action takes place due to the aforementioned disposition of the split rings 92 on the synchronizer ring 84. Thus as soon as the speed of the synchronizer ring 84 exceeds slightly the speed of the input shaft member 14, said split rings 92 tend to be unwrapped from around the outside of said synchronizer ring 84 into tighter frictional engagement with the input shaft member 14. The resulting large frictional drag reacts on the synchronizer ring and, by means of the split ring heads 94 and cross slots 96, tends to reduce the speed of said synchronizer ring to the same value as that of the input shaft 10. Thereupon, the clutch member 74 will shift smartly to the right along the helical splines 82 (to the position illustrated in Figure 1) thereby effecting engagement of the clutch teeth 86 and 88. Because the engageable faces of the clutch teeth 86 and 88 are undercut, as illustrated in Figure 6, the torque on said faces will pull the clutch teeth into complete engagement. When the clutch teeth 86 and 88 are engaged the composite pinion carrier member 38, 40 is restrained to rotation at the same speed as that of the input shaft 10 thereby providing a relatively low step-up speed ratio drive from the input member 32 to the output member 34.

The faces 100 and 102 of the clutch teeth 86 and 88, respectively, are inclined so as to throw said teeth out of engagement when the speed of the input shaft 10 exceeds that of the clutch member 74. Thus when the friction brake 52, 60 is engaged to hold the pinion carrier member 38, 40 stationary, the clutch member 74 is also held against rotation whereby the faces 100 and 102 of the clutch teeth 86 and 88 ride over each other to shift the clutch member 74 toward the shoulder 98. As previously described, the clutch member 74 is held against the shoulder 98 at any time the input shaft 10 has a higher speed than said clutch member. This is due to the slight frictional drag occurring between the split rings 92 and the interior surface of the annular input member 14 even though the split rings are being wrapped up to effect a reduction of frictional drag. As already mentioned, when the friction brake 52, 60 is engaged, a relatively high step up speed drive is provided from the input member 32 to the output member 36. Because said friction brake holds the clutch member 74 and synchronizer ring 84 stationary during operation in high step-up speed ratio, the input member 10 will, during brake engagement, always have a higher speed thereby holding the clutch member 74 against the shoulder 98. This prevents undue wear and possible damage to the clutch teeth 86 and 88 during all operation in the high step-up speed ratio.

It should be apparent that the split rings 92 instead of being annular could be helically wrapped around the synchronizer ring 84. For example the two split rings 92 could be replaced by a single helical ring wrapped around the synchronizer ring 84 with one end anchored to said synchronizer ring and with the free end of said helical ring pointing in the direction of rotation of the input shaft 10.

The invention has been described in connection with a transmission similar to that illustrated in Figure 5 of said copending application. In accordance with the present invention a one-way jaw clutch has been substituted for the one-way roller clutch of said prior transmission. It should be obvious that a one-way jaw clutch could be similarly substituted for the one-way clutch embodied in the transmission of Figure 1 of said copending application.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. In a multi-speed transmission; a planetary gear train comprising an input member, an output member and a torque reaction member; a brake engageable to prevent rotation of said reaction member, said reaction member being arranged to rotate in the direction of the reaction torque acting thereon upon disengagement of said brake during transmission of torque by said gear train; a rotatable member; gearing connecting said rotatable member to said gear train for rotation in the direction of said reaction torque at a speed less than the speeds of said input and output members; and a one-way jaw clutch automatically engageable upon release of said brake to limit the speed of rotation of said reaction member to the speed of said rotatable member.

2. In a multi-speed transmission; a planetary gear train comprising an input member, an output member and a torque reaction member; a brake engageable to prevent rotation of said reaction member, said reaction member being arranged to rotate in the direction of the reaction torque acting thereon upon disengagement of said brake during transmission of torque by said gear train; a rotatable member; gearing connecting said rotatable member to said gear train for rotation in the direction of said reaction torque at a speed less than the speeds of said input and output members; and a one-way jaw clutch automatically engageable upon release of said brake to limit the speed of rotation of said reaction member to the speed of said rotatable member; said jaw clutch including clutch teeth on one of said reaction and rotatable members, a clutch member rotatable with the other of said reaction and rotatable members and having clutch teeth; and means including helical splines on said clutch member for moving said clutch member to effect engagement of said clutch teeth when the speed of said reaction member tends to exceed that of said rotatable member.

3. A multi-speed transmission comprising an input shaft; a planetary gear train including an input member, an output member and a rotatable torque reaction member; means providing a step-up speed ratio drive from said input shaft to said input member; a brake engageable to prevent rotation of said reaction member to provide a high speed ratio drive between said input and output members, said reaction member being arranged to rotate in the direction of the reaction torque acting thereon upon release of said brake during transmission of torque by said gear train; and a one-way jaw clutch automatically engageable upon release of said brake to limit the speed of rotation of said reaction member to the speed of said input shaft thereby providing a low speed ratio drive between said input and output members.

4. A multi-speed transmission comprising an input shaft; a planetary gear train including an input member, an output member and a rotatable torque reaction member; means providing a step-up speed ratio drive from said input shaft to said input member; a brake engageable to prevent rotation of said reaction member to provide a high speed ratio drive between said input and output members, said reaction member being arranged to rotate in the direction of the reaction torque acting thereon upon release of said brake during transmission of torque by said gear train; and a one-way jaw clutch automatically engageable upon release of said brake to limit the speed of rotation of said reaction member to the speed of said input shaft thereby providing a low speed ratio drive between said input and output members; said jaw clutch including clutch teeth on one of said input shaft and reaction member, a clutch member rotatable with the other of said input shaft and reaction member and having clutch teeth, and means including helical splines on said clutch member for moving said clutch member to effect engagement of said clutch teeth when the speed of said reaction member tends to exceed that of said input shaft.

5. A multi-speed transmission comprising an input shaft; a planetary gear train including an input member, an output member and a rotatable torque reaction member; means providing a step-up speed ratio drive from said input shaft to said input member; a brake engageable to prevent rotation of said reaction member to provide a high speed ratio drive between said input and output members, said reaction member being arranged to rotate in the direction of the reaction torque acting thereon upon release of said brake during transmission of torque by said gear train; and a one-way jaw clutch automatically engageable upon release of said brake to limit the speed of rotation of said reaction member to the speed of said input shaft thereby providing a low speed ratio drive between said input and output members; said jaw clutch including a clutch member mounted for rotation with and for axial movement relative to said reaction member and for axial movement relative to said input shaft, said clutch member having clutch teeth adapted to engage and disengage corresponding clutch teeth on said input shaft in response to axial movement of said clutch member relative to said input shaft.

6. A multi-speed transmission comprising an input shaft; a planetary gear train including an input member, an output member and a rotatable torque reaction member; means providing a step-up speed ratio drive from said input shaft to said input member; a brake engageable to prevent rotation of said reaction member to provide a high speed ratio drive between said input and output members, said reaction member being arranged to rotate in the direction of the reaction torque acting thereon upon release of said brake during transmission of torque by said gear train; and a one-way jaw clutch automatically engageable upon release of said brake to limit the speed of rotation of said reaction member to the speed of said input shaft thereby providing a low speed ratio drive between said input and output members; said jaw clutch including a clutch member mounted for rotation with and for axial movement relative to said reaction member, a ring helically splined to said clutch member, axially extending jaw clutch teeth on said clutch member and input shaft, and means adapted to provide a slip drive connection between said ring and said input shaft when the speed of rotation of said clutch member tends to exceed that of said input shaft for urging said clutch member along said helical splines to effect engagement of said clutch teeth.

7. In a multi-speed transmission as recited in claim 6 in which said slip drive connection comprises a split ring carried by said helically splined ring for rotation therewith, said split ring being biased into frictonal drving engagement with said input shaft.

8. In a multi-speed transmission as recited in claim 6 in which said slip drive connection comprises a split ring carried by said helically splined ring for rotation therewith, said split ring being biased into frictional driving engagement with said input shaft, one end of said split ring being anchored to said helically splined ring and the other end of said split ring pointing in the direction of rotation of said input shaft.

FRANCIS W. PORTER.

REFERENCES CITED

The following references are of record in the file of this patent:

UNITED STATES PATENTS

| Number | Name | Date |
|---|---|---|
| 1,791,393 | Viale | Feb. 3, 1931 |
| 1,924,723 | Nowak | Aug. 29, 1933 |
| 2,022,058 | Steuber | Nov. 26, 1935 |
| 2,099,675 | Cutler | Nov. 23, 1937 |
| 2,263,159 | Berger | Nov. 18, 1941 |
| 2,301,072 | Nardone | Nov. 3, 1942 |